(12) United States Patent
Lo

(10) Patent No.: US 8,348,798 B2
(45) Date of Patent: Jan. 8, 2013

(54) HUB MOTOR FOR ELECTRIC VEHICLES

(76) Inventor: Chiu-Hsiang Lo, Taichung County (TW)

( * ) Notice: Subject to any disclaimer, the term of this patent is extended or adjusted under 35 U.S.C. 154(b) by 41 days.

(21) Appl. No.: 13/172,023

(22) Filed: Jun. 29, 2011

(65) Prior Publication Data

US 2012/0083376 A1 Apr. 5, 2012

Related U.S. Application Data

(63) Continuation-in-part of application No. 12/896,142, filed on Oct. 1, 2010.

(30) Foreign Application Priority Data

Mar. 11, 2011 (TW) .............................. 00108216 A

(51) Int. Cl.
F16H 48/06 (2006.01)
F16H 48/30 (2012.01)
B60K 1/00 (2006.01)

(52) U.S. Cl. ...................... 475/149; 475/150; 180/65.51
(58) Field of Classification Search .................. 475/149, 475/150
See application file for complete search history.

(56) References Cited

U.S. PATENT DOCUMENTS

| 3,897,843 | A | * | 8/1975 | Hapeman et al. | ........... 180/65.51 |
| 4,294,138 | A | * | 10/1981 | Fukui | .............................. 475/269 |
| 4,346,777 | A | * | 8/1982 | Restelli | .......................... 180/220 |
| 4,913,258 | A | * | 4/1990 | Sakurai et al. | ................ 180/242 |
| 5,273,500 | A | * | 12/1993 | Nagano | ........................... 475/312 |
| 6,321,863 | B1 | * | 11/2001 | Vanjani | ...................... 180/65.51 |
| 6,974,399 | B2 | * | 12/2005 | Lo | ..................................... 475/5 |
| 7,357,743 | B2 | * | 4/2008 | Mao et al. | ........................... 475/5 |
| 7,375,450 | B2 | * | 5/2008 | Tanaka et al. | ........... 310/216.004 |
| 7,472,770 | B2 | * | 1/2009 | Tomoshige et al. | ......... 180/65.51 |
| 7,719,412 | B2 | * | 5/2010 | Hattori et al. | .................. 340/442 |
| 2005/0264112 | A1 | * | 12/2005 | Tanaka et al. | ................ 310/75 C |

* cited by examiner

Primary Examiner — David D Le
Assistant Examiner — Colby M Hansen

(57) ABSTRACT

A hub motor for driving a wheel of an electric vehicle and includes a cylindrical casing fixed to the wheel of an electric vehicle and a ring gear and a coil unit are fixed to the casing. A central unit includes co-axial two fixed axles and a shaft. Multiple bearings are located between the casing and the central unit so that the casing is rotatable relative to the central unit. The shaft has a magnet unit and a sun gear fixed thereto, a planet gear frame is connected to the fixed axle by a one-way bearing. Multiple planet gears are connected to the planet gear frame. The planet gears are engaged with the ring gear and the sun gear. The hub motor is simplified structure and easily assembled.

6 Claims, 7 Drawing Sheets

HUB MOTOR FOR ELECTRIC VEHICLES

FIELD OF THE INVENTION

The present invention is a Continuation-In-Part application of applicant's former U.S. patent application Ser. No. 12/896,142, filed on Oct. 1, 2010.

BACKGROUND OF THE INVENTION

There are different types of driving mechanisms for electric vehicles and the hub motors are developed to improve the shortcomings of the conventional driving mechanism which require long transmission system and are not suitable for electric wheeled chairs. The conventional hub motors are disclosed in U.S. Pat. No. 3,897,843, 4,346,777, 4,913,258 and 7,719,412. All of the disclosures relate to the use of electric motor directly driving the wheels.

Another conventional hub motor is disclosed in U.S. Pat. No. 6,321,863 and includes an electrical motor received in a hub which is driven by the electrical motor. Nevertheless, the lack of better speed changing system for the conventional hub motor, electrical motor wastes too much electric power and the efficiency of the rotation of the hub is not satisfied. Some alternative inventions for the hub motors are disclosed in U.S. Pat. No. 4,294,138 and 5,273,500. Although a planetary gear system is used in these inventions, the lack of the use of electrical motor makes the hub be inconvenient in practical use.

The applicant of the present invention has devoted a lot of efforts in research and development to improve conventional hub motor. For example, U.S. Pat. No. 6,974,399 owned by the applicant is provided a hub assembly which is driven by an electrical motor with a planetary gear system connected with the electrical motor so as to smoothly and efficiently rotate the hub. U.S. Patent Application 12/896,142 discloses a hub motor which is also owned by the applicant of the present invention and improves shortcomings of the conventional hub motors. However, applicant further improves the present invention which is more advanced than the hub motor mentioned above.

SUMMARY OF THE INVENTION

The first object of the present invention is to provide a hub motor for driving a wheel of an electric vehicle. The hub motor includes a rim, a connection member, a casing, a ring gear, a coil unit, a central unit, a magnet unit, a sun gear, a planet gear frame and multiple planet gears. The ring gear and the coil unit are fixed in the casing which is rotatable relative to the central unit. The central unit includes a first fixed axle, a second fixed axle and a shaft which is rotatable relative to the casing. The magnet unit and the sun gear are fixed to the shaft. The planet gear frame is fixed to the first fixed axle by a one-way bearing and multiple planet gears are connected to the planet gear frame. The planet gears are engaged with the sun gear and the ring gear. The casing includes two open ends and a first closing member and a second closing member are located on the two open ends of the casing. A separation board is located in the mediate portion of the casing. The first closing member has a first bearing and a third bearing connected thereto. The first bearing is mounted to the first fixed axle and the third bearing is mounted to the shaft. A second bearing and a fourth bearing are respectively connected to the second closing member and the separation board. The fourth bearing is mounted to the shaft and the second bearing is mounted to the second fixed axle. The central unit includes the first fixed axle, the second fixed axle and the shaft. The shaft and the second fixed axle are connected to each other by a fifth bearing, and the planet gear frame is connected to the second fixed axle by a one-way bearing.

The second object of the present invention is to provide a hub motor which has its own power supply and has an integral body so as to easily assemble to different electric vehicles. The wires of the hub motor do not need to extend along the whole frame of the vehicles. The connecting members of the rim fix the motor housing, the battery and the control device. The battery provides electric power to the hub motor and the control device receives a wireless command signal and generates a control signal to control the battery to provide power to the hub motor.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
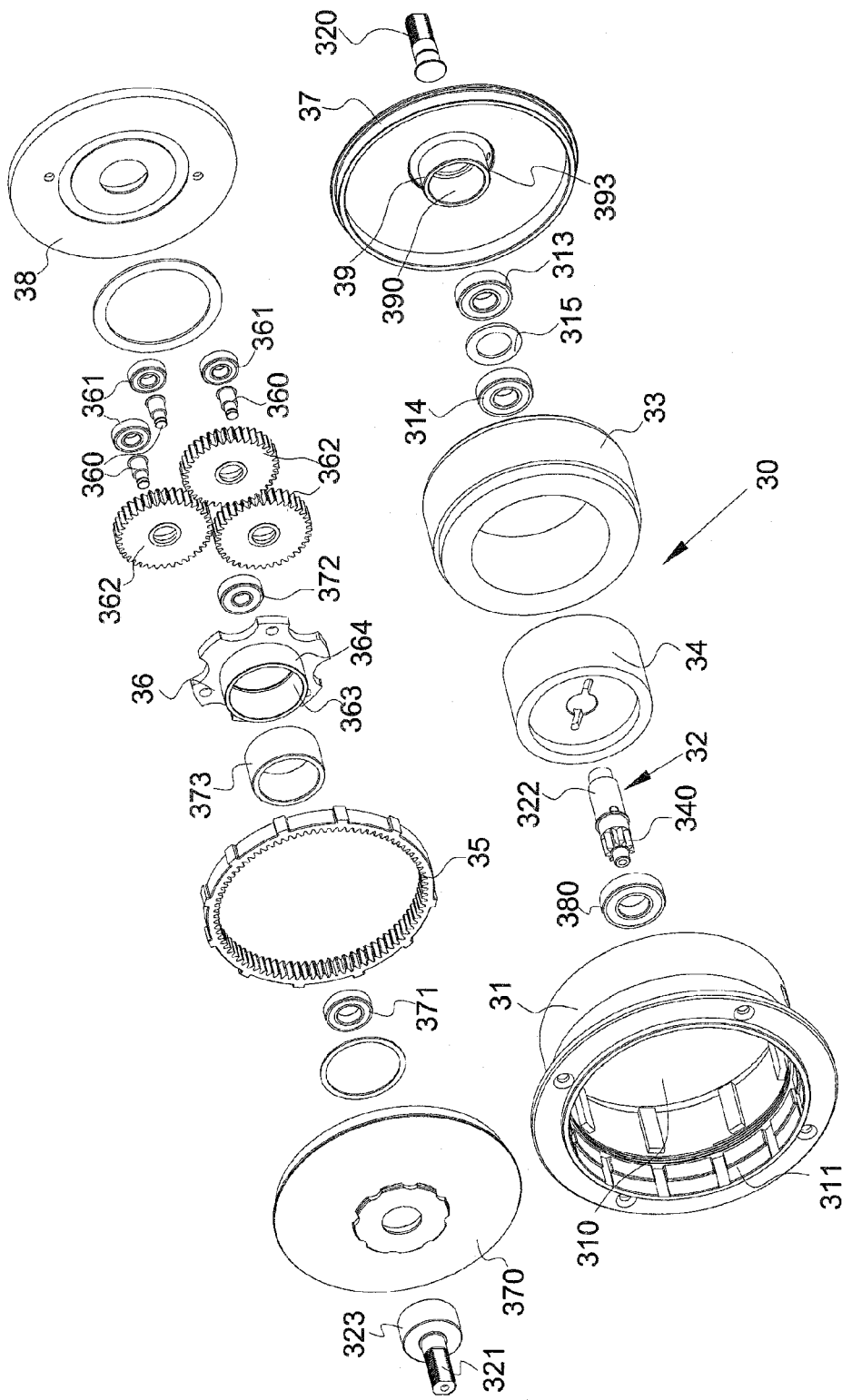
FIG. 1 is an exploded view to show the hub motor of the present invention.
Figure 2:
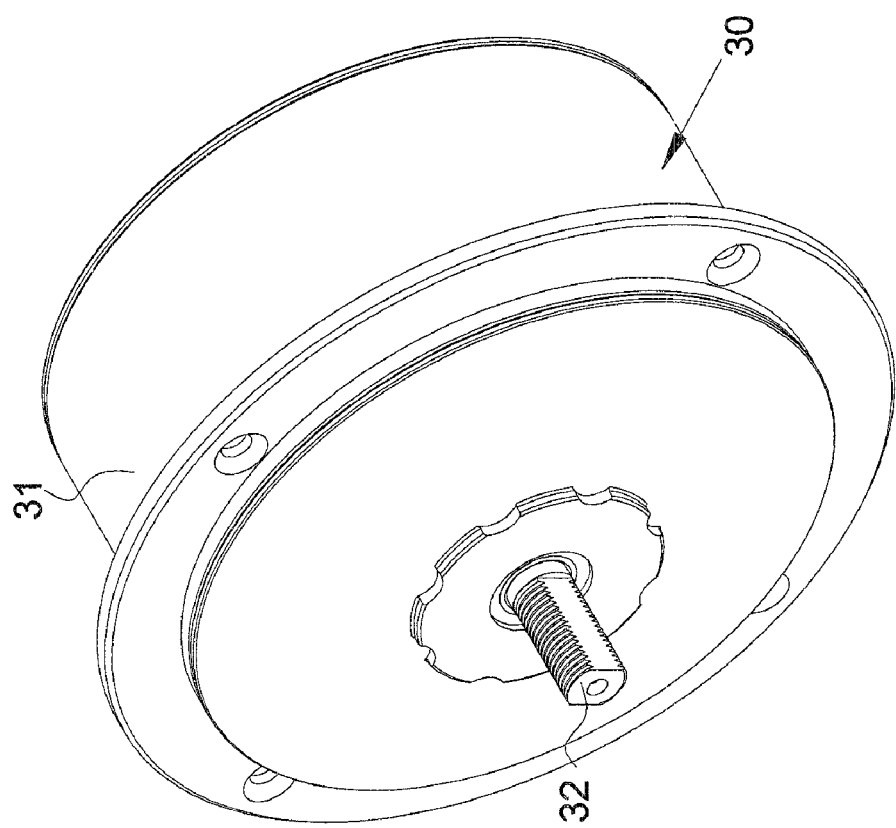
FIG. 2 is a perspective view to show the hub motor of the present invention.

Referring to FIGS. 1 to 5, the hub motor 30 of the present invention is connected to and drives the wheel 20 of an electric vehicle, and the hub motor 30 comprises a cylindrical casing 31 which is connected to the wheel 20, a ring gear 35 fixed in the casing 31, a coil unit 33 fixed on the casing 31, and a central unit 32 extending along an axis of the casing 31. The central unit 32 has a first fixed axle 320, a second fixed axle 321 and a shaft 322. The first and second fixed axes 320, 321 each have two opposite ends. The first end of the first fixed axle 320 and the second end of the second fixed axle 321 are respectively connected to the electric vehicle, such as the front fork or the chain stays of an electric bicycle. A first bearing 313 is located between the first fixed axle 320 and the casing 31, and a second bearing 371 is located between the second fixed axle 321 and the casing 31. Therefore, the casing 31 is rotatable relative to the first fixed axle 320, the second fixed axle 321 and the whole central unit 32. The shaft 322 has a first end and a second end. A sun gear 340 and a magnet unit 34 are mounted to the shaft 322. A third bearing 314 and a fourth bearing 380 are located between the shaft 322 and the casing 31. The casing 31 is rotatable relative to the shaft 322. The shaft 322 is located co-axially with the first fixed axle 320 and the second fixed axle 321. The shaft 322 is rotatable relative to the first fixed axle 320 and the second fixed axle

321. The magnet unit 34 is located corresponding to the coil 33 so that the coil unit 33 is not in contact with the magnet unit 34.

A planet gear frame 36 is a star-shaped frame and co-axially and rotatably mounted to the central unit 32, and the planet gear frame 36 rotatable relative to the central unit 32 in one direction only. The planet gear frame 36 includes a first end surface and a second end surface, the first end surface has three pivots 360 which are located at even angular distance and each pivot 360 is connected with a planet gear 362 with a bearing 361 located therebetween. The planet gears 362 are located within the ring gear 35 and engaged with the sun gear 340 and the ring gear 35.

Figure 3:
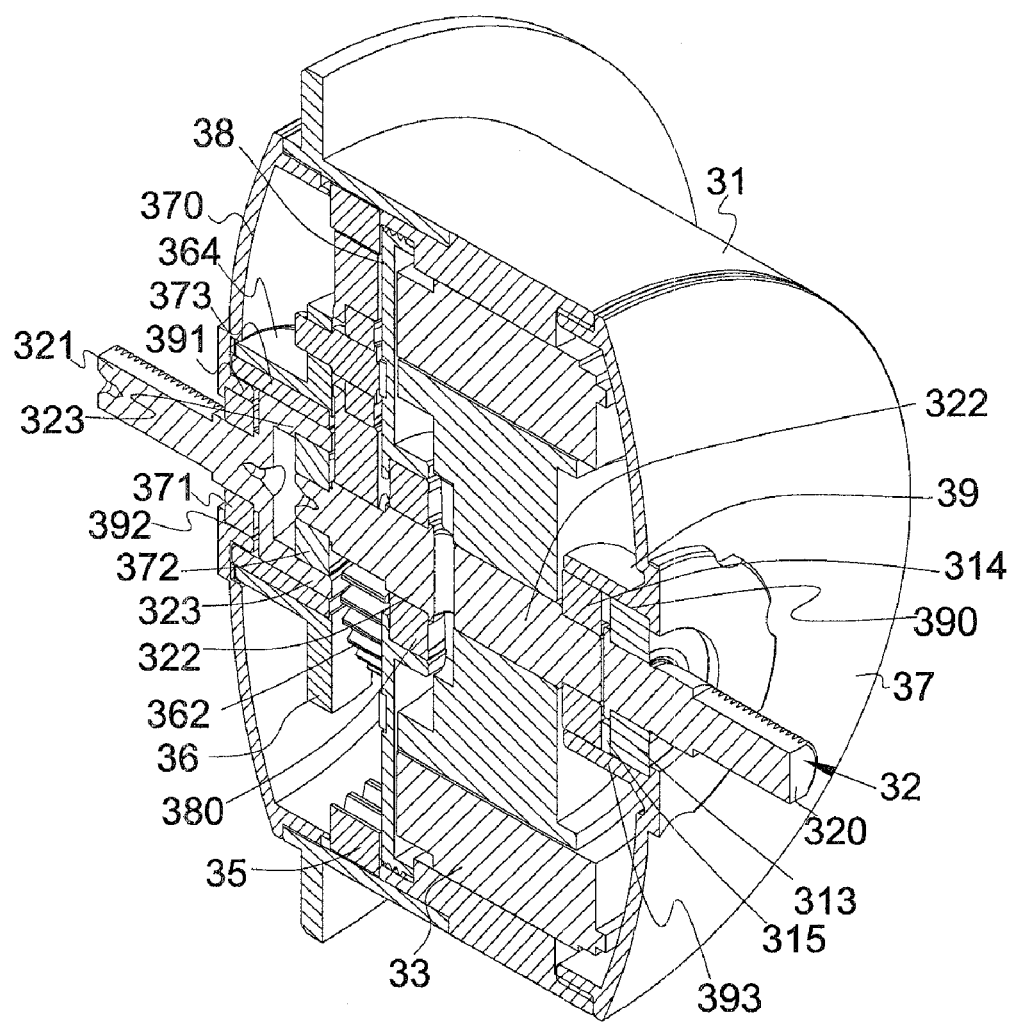
FIG. 3 is a perspective view, partly removed, of the hub motor of the present invention.
Figure 4:
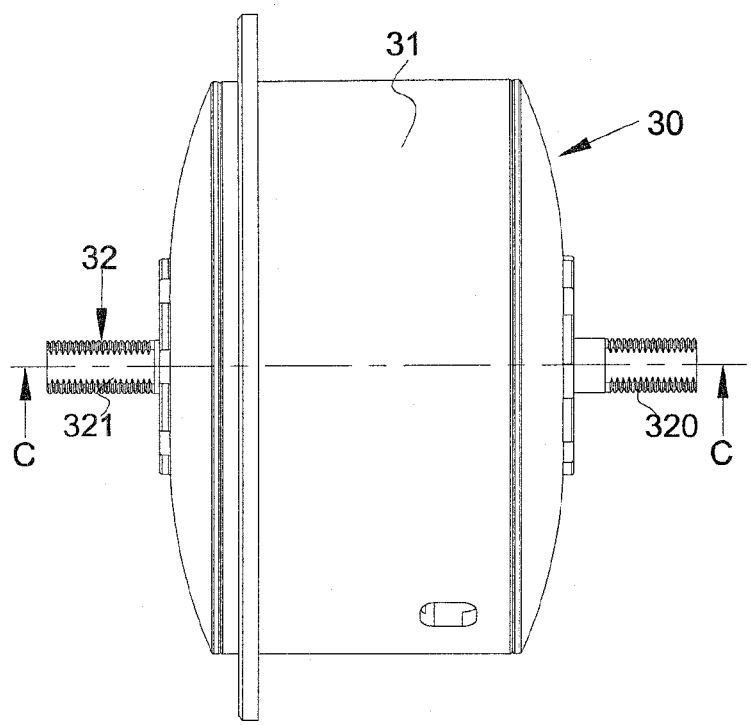
FIG. 4 is a side view of the hub motor of the present invention.
Figure 5:
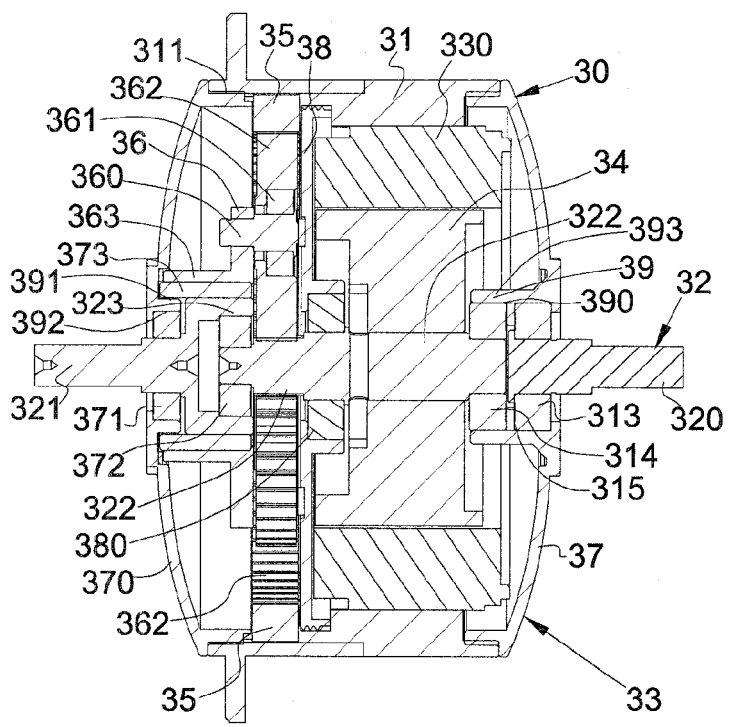
FIG. 5 is a cross sectional view, taken along line C-C in FIG. 4.

As shown in FIGS. 3 and 5, the magnet unit 34 is connected to the mediate portion of the shaft 322 and the sun gear 340 is fixed to the shaft 322 and located close the to the second end surface of the shaft 322. The casing 31 has a ring gear 35 fixed to the inside thereof. The second end surface of the planet gear frame 36 has a first sleeve 364 extending axially therefrom, the first sleeve 364 has an axial penetrating hole 363 and is located around the first end of the second fixed axle 321 and has a one-way bearing 373 connected thereto, so that the one-way bearing 373 is received in the penetrating hole 363. The planet gear frame 36 is rotatable relative to the second fixed axle 321 and the central unit 32 in only one direction by the one-way bearing 373.

In a preferably embodiment, the first end of the second fixed axle 321 and the second end of the shaft 322 is connected to each other by a fifth bearing 372. The first end of the second fixed axle 321 has a second sleeve 323 connected thereto. The second sleeve 323 is located around the second end of the shaft 322 and the first sleeve 364 is mounted to the second sleeve 323. The fifth bearing 372 is located between the second sleeve 323 and the second end of the shaft 322. The shaft 322 properly supports the second fixed axle 321 by the fifth bearing 372, so that the second fixed axle 321 supports the one-way bearing 373, the planet gear frame 36 and the planet gears 362.

As shown in FIGS. 3 and 5, the casing has a first opening 310 and a second opening 311, wherein a first closing member 37 and a second closing member 370 respectively seal the first and second openings 310, 311 of the two ends of the casing 31. A separation board 38 is located in the mediate portion of the casing 31. The first closing member 37 has a first bearing seat 39 fixed to the center thereof. The first bearing seat 39 has a third sleeve 393 extending from an end thereof and the third sleeve 393 has an open end so as to define a first room 390 which receives the first and third bearings 313, 314. The second closing member 370 has a second bearing seat 391 connected to the center thereof and the second bearing seat 391 has a second room 392 in which the second bearing 371 is received. The separation board 38 has a third bearing frame 381 connected to the center thereof and the third bearing frame 381 has a third room 382 in which the fourth bearing 380 is received. The first bearing 313 is mounted to the first fixed axle 320 and the second bearing 371 is mounted to the second fixed axle 321. The first and second fixed axes 320, 321 respectively extend through the first closing member 37 and the second closing member 370. The third bearing 314 and the fourth bearing 380 are mounted to the shaft 322 which extends through the separation board 38. The magnet unit 34 is located between the third bearing 314 and the fourth bearing 380. The fourth bearing 380 is located between the magnet unit 34 and the sun gear 340. The first bearing seat 39 has a third sleeve 393 extending from an end thereof. The third sleeve 393 includes an open end so as to form the first room 390 which receives the first bearing 313, a washer 315 and the third bearing 314. The washer 315 separates the first bearing 313 from the third bearing 314.

Referring to FIGS. 1 and 6 to 8, the hub motor 30 of the present invention is connected to a wheel 1, the wheel 1 comprises a rim 10 and at least one connecting member 11. The connecting member 11 includes a first end 110 and a second end 111 which extends in opposite direction from that of the first end 110. The first end 110 is connected to the inside of the rim 10 and the second end 111 extends toward the center of the rim 10. The at least one connecting member 11 has at least one battery 40 and a control device 50 connected thereto. The control device 50 receives a wireless command signal and generates a control signal to control the battery 40 to provide power to the hub motor.

Figure 6:
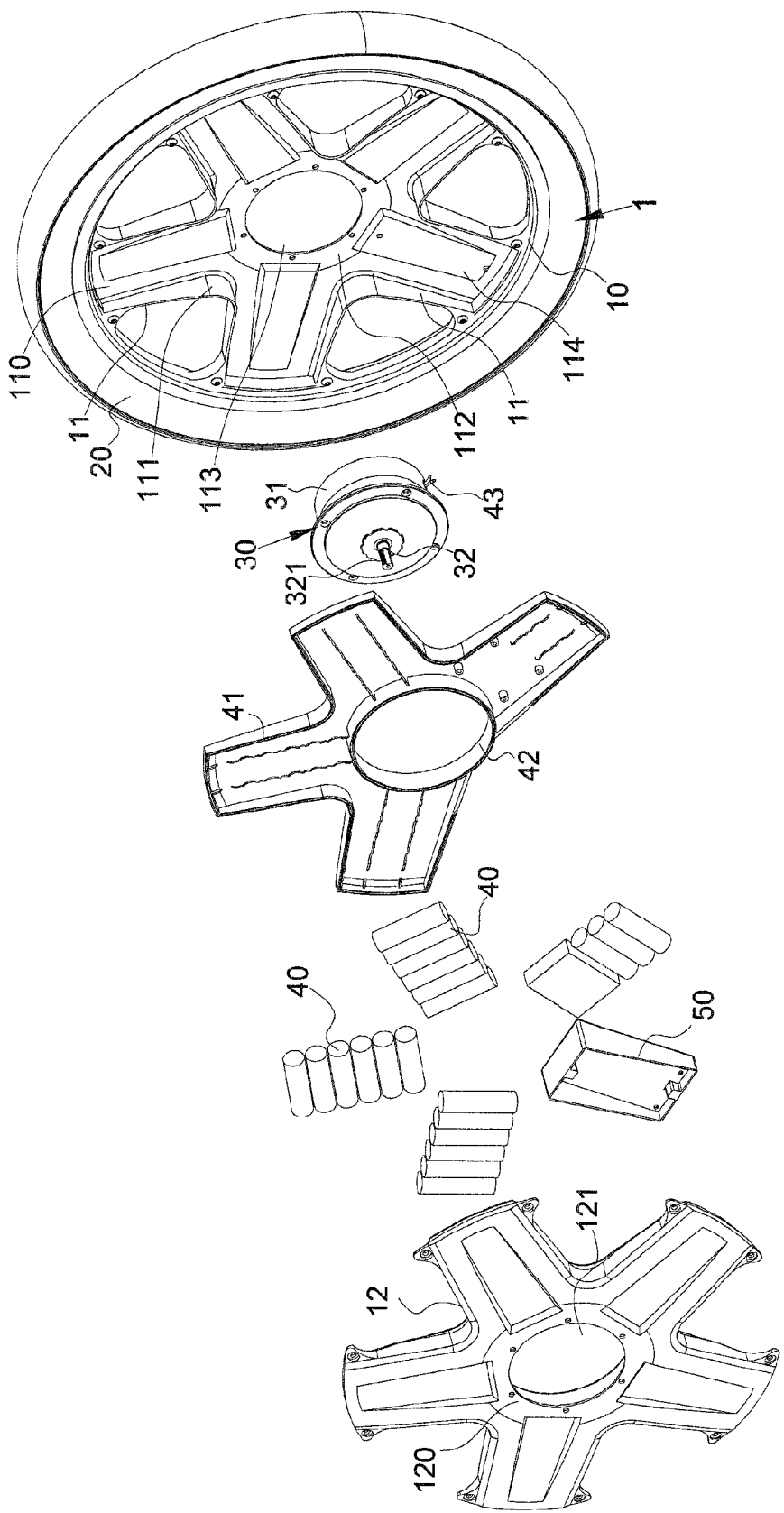
FIG. 6 is an exploded view to show the hub motor of the present invention and a wheel.
Figure 7:
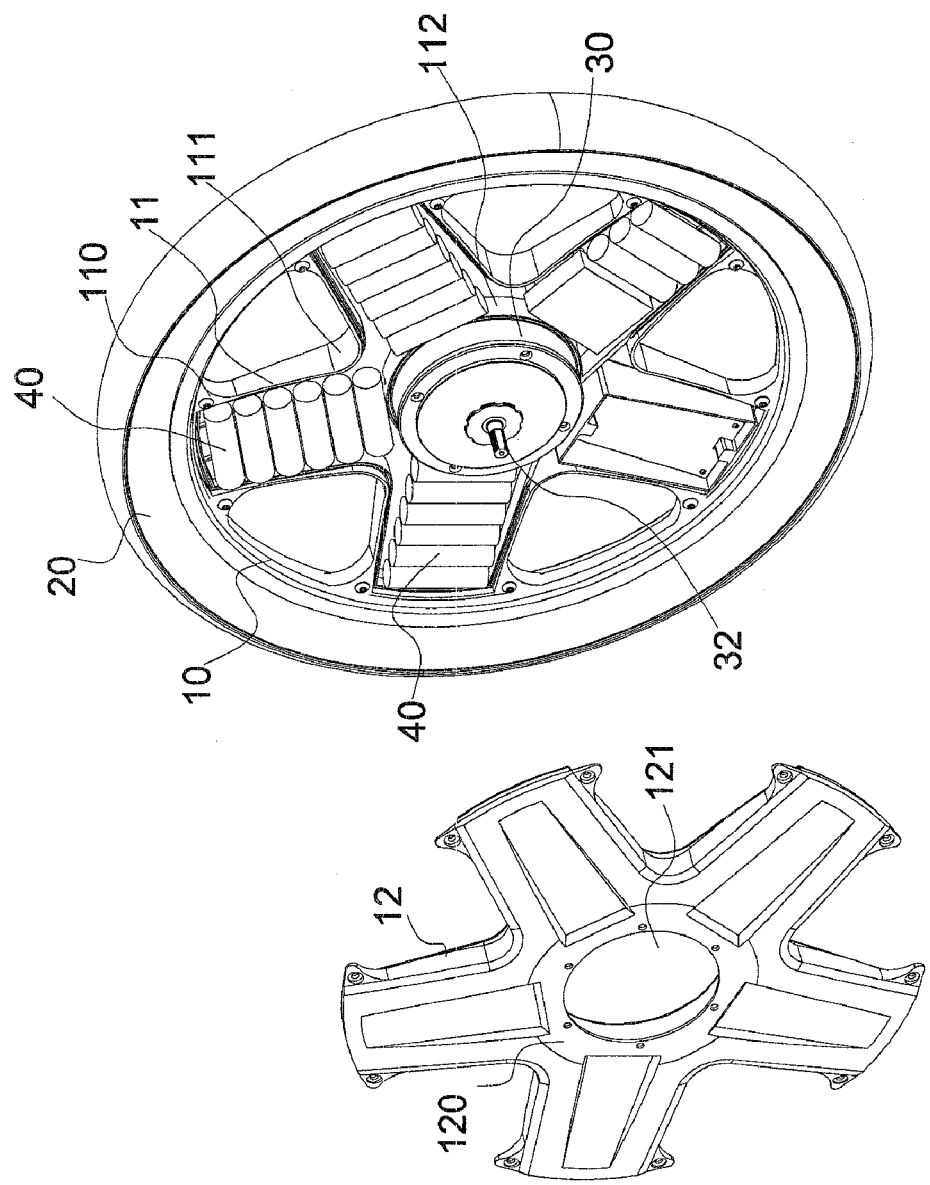
FIG. 7 is an exploded view to show the hub motor of the present invention connected to the rim and a wheel cover.
Figure 8:
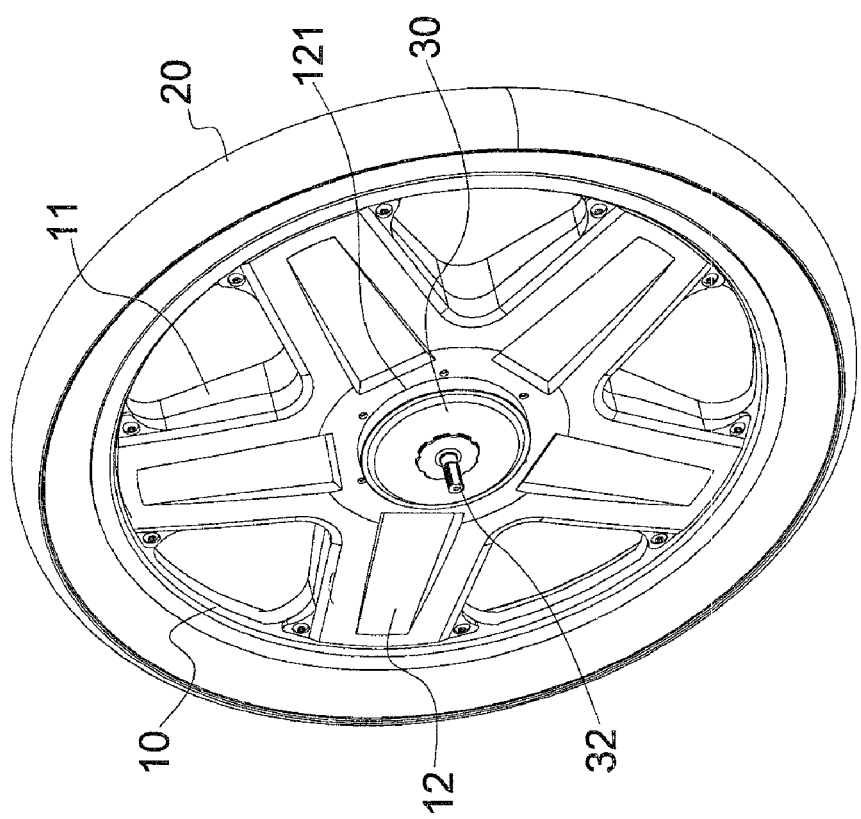
FIG. 8 is a perspective view to show the hub motor of the present invention connected with the wheel.

As shown in FIGS. 3, 5 and 6, the coil unit 33 is fixed to the casing 31 which is integrally connected to the rim 10, and the at least one battery 40 is connected to the rim 10. The at least one battery 40 and the coil unit 33 are rotated with the rotation of the rim 10, so that wires 43 can be directly connected between the at least one battery 40 and the coil unit 33. The rim 10 has the hub motor 30 and the at least one battery 40.

As shown in FIGS. 3, 5 and 6, the at least one battery 40 and the coil unit 33 are connected to each other by the wires 43 which do not pass through the inside of the central unit 32 and extend out. The wires 43 directly extend through the casing 31 and one end of each wire 43 is located outside of the casing 31 and electrically connected to the at least one battery 40, the other end of each wire 43 is located within the casing 31 and electrically connected with the coil unit 33. Therefore, the central unit 32 does not need to be drilled and the structural strength is reinforced.

Referring to FIGS. 1, 5, and 6 to 8, the hub motor 30 of the present invention is connected to a wheel 1, the wheel 1 comprises a rim 10 and at least one connecting member 11. There are multiple connecting members 11 located in the rim 11 and each connecting member 11 is a board-like member. A recess 114 is defined in a surface of the connecting member 11 and a box 41 is engaged with the recess 114. At least one battery 40 is located in the recess 114. The respective second ends of the multiple connecting members 11 are connected to each other to form a first fixing portion 112 which is in a star-shaped portion. The motor housing 31 is fixed to the first fixing portion 112 and has a first hole 113 at a center thereof. The shaft 32 extends through the first hole 113. The rim 10 has a star-shaped cover 12 connected thereto which are connected to the connecting members 11 so as to close the recesses 114 and to position the boxes 41 with the batteries 40 in the recesses 114. A second fixing portion 120 is located at a center of the cover 12 and the casing 31 is fixed to the second fixing portion 120. A second hole 121 is defined through the second fixing portion 120 and the central unit 32 extends through the second hole 121. In one preferable embodiment as shown in FIG. 6, the box 41 is a star-shaped box and a circular hole 42 is defined in a center thereof and the casing 31 extends through the circular hole 42. The box 41 accommodates multiple batteries 40 which are located in radial direction of the rim 10.

The structure of the hub motor of the present invention is simplified so as to be easily cooperated with electric vehicles. The central unit of the hub motor includes the first fixed axle, the second fixed axle and the shaft, and the one-way bearing is located between the planet gear frame and the second fixed axle, so that the whole system is simplified and easily to be assembled. The fifth bearing is located between the second fixed axle and the shaft to provide stable support to the hub motor.

While we have shown and described the embodiment in accordance with the present invention, it should be clear to those skilled in the art that further embodiments may be made without departing from the scope of the present invention.

What is claimed is:

1. A hub motor of vehicles comprising:
    a cylindrical casing adapted to be fixed to a wheel, the wheel includes a rim and at least one connecting member connected to the inside of the rim, the at least one connecting member extending toward the center of the rim;
    a ring gear fixed in the casing;
    a coil unit fixed on the casing;
    a central unit extending along an axis of the casing and having a first fixed axle, the first fixed axle having a first end and a second end, the first end of the first fixed axle adapted to be fixed to the vehicle, a first bearing located between the first fixed axle and the casing, the casing being rotatable relative to the first fixed axle;
    a second fixed axle having a first end and a second end, the second end of the second fixed axle adapted to be fixed to the vehicle, a second bearing located between the second fixed axle and the casing, the casing rotatable relative to the second fixed axle;
    a shaft located co-axially with the first and second fixed axes, the shaft having a first end and a second end, a sun gear and a magnet unit mounted to the shaft, a third bearing and a fourth bearing located between the shaft and the casing, the casing rotatable relative to the shaft, the shaft is located co-axially with the first fixed axle and the second fixed axle, the shaft rotatable relative to the first fixed axle and the second fixed axle, and
    a planet gear frame co-axially and rotatably mounted to the central unit, the planet gear frame rotatable relative to the central unit in one direction only and having a first end surface and a second end surface, the first end surface having multiple planet gears rotatably connected thereto, the planet gears engaged with the ring gear and the sun gear.

2. The hub motor as claimed in claim 1, wherein the second end surface of the planet gear frame has a first sleeve extending axially therefrom and the first sleeve located around the first end of the second fixed axle and has a one-way bearing connected thereto, the planet gear frame is rotatable relative to the second fixed axle and the central unit in only one direction by the one-way bearing.

3. The hub motor as claimed in claim 1, wherein the first end of the second fixed axle and the second end of the shaft is connected to each other by a fifth bearing.

4. The hub motor as claimed in claim 3, wherein the first end of the second fixed axle has a second sleeve connected thereto, the second sleeve is located around the second end of the shaft, the fifth bearing is located between the second sleeve and the second end of the shaft.

5. The hub motor as claimed in claim 1, wherein a first closing member and a second closing member are located on two ends of the casing, a separation board is located in a mediate portion of the casing, the first closing member has a first bearing seat fixed thereto, the first bearing seat has a first room which receives the first and third bearings, the second closing member has the second bearing connected thereto, the separation board has the fourth bearing connected thereto, the first bearing is mounted to the first fixed axle and the second bearing is mounted to the second fixed axle, the third bearing and the fourth bearing are mounted to the shaft, the magnet unit is located between the third bearing and the fourth bearing, the fourth bearing is located between the magnet unit and the sun gear.

6. The hub motor as claimed in claim 5, wherein the first bearing seat has a third sleeve extending from an end thereof, the third sleeve includes an open end so as to form the first room, the first room receives the first bearing, a washer and the third bearing, the washer separates the first bearing from the third bearing.

* * * * *